March 20, 1928.
I. D. RICHHEIMER
1,663,317
SPOUT FOR COFFEEPOTS AND THE LIKE
Filed Aug. 20. 1924
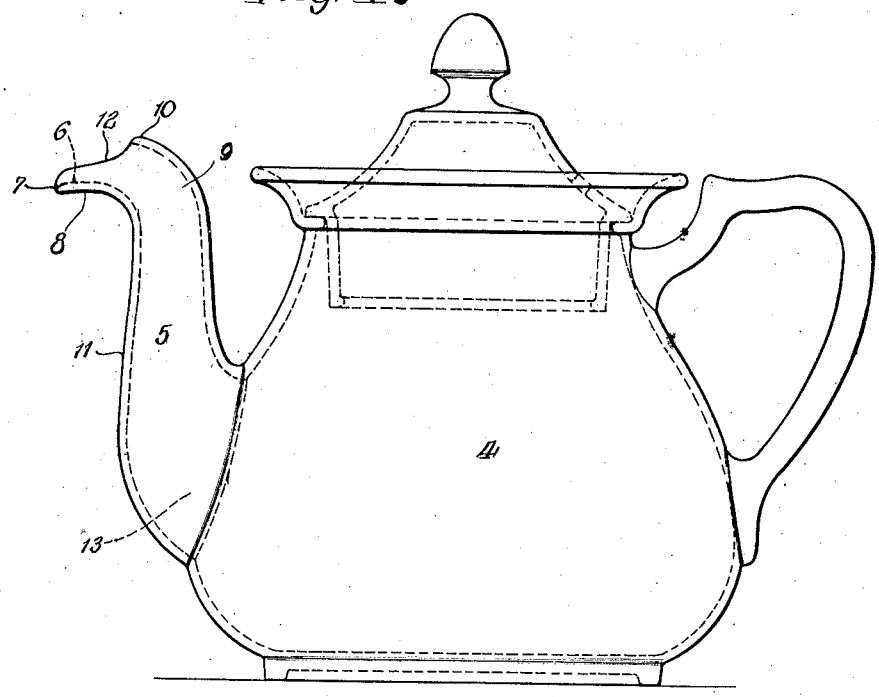
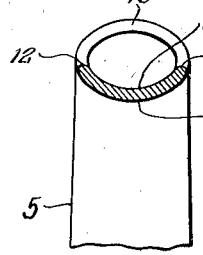
Inventor:
Isaac D. Richheimer
By: Wm O. Bell
Atty.

Patented Mar. 20, 1928.

1,663,317

UNITED STATES PATENT OFFICE.

ISAAC D. RICHHEIMER, OF NEW YORK, N. Y.

SPOUT FOR COFFEEPOTS AND THE LIKE.

Application filed August 20, 1924. Serial No. 733,048.

A common complaint incident to the use of coffee pots and the like arises from the fact that, after a pouring operation, the coffee or other contents will drip from the lip or drivel down the spout and stain the table cloth. The housewife often wipes the spout with a napkin to prevent this dripping and driveling. The dripping can be prevented to a large extent by exercising special care in pouring, and also by engaging a cup with the lip of the spout to remove the drop which generally forms thereon; but the drivel down the spout may occur without attracting attention and it makes an unsightly spot on the table cloth and presents a messy appearance.

It is my object to overcome this defect in pouring spouts of coffee pots, or the like, and to provide a spout which will prevent driveling and to a large extent also prevent dripping.

I am aware that the dripping and driveling from the spout of a coffee pot, or the like, depends to a considerable extent upon the care exercised in pouring, but my invention aims to prevent dripping and driveling under those conditions when care in pouring is most generally exercised and dripping and driveling are most objectionable. I have devoted many years to the production of devices and apparatus for making table coffee and my attention has been directed to this objection which appears to be common in spouts of coffee pots, teapots, and the like. I have examined and tested a great many pots having pouring spouts, in this country and abroad, and I have never yet discovered one which would not drip and drivel. I have conducted many experiments and tests and have had pots made with different kinds of spouts according to my directions, both in this country and abroad, and it has only been after many failures that I have finally produced a spout for a coffee pot which will pour evenly and smoothly and will not drip or drivel under ordinary conditions.

In the accompanying drawings I have shown a coffee pot having a spout embodying the invention and referring thereto Fig. 1 is an elevation of the pot.

Fig. 2 is an enlarged sectional view of the spout.

Fig. 3 is a transverse sectional view on the line 3—3 of Fig. 2, and

Fig. 4 is a sectional view on the line 4—4 of Fig. 2.

Referring to the drawings, 4 is the body of the coffee pot and 5 is the spout which is connected with the body at the location and in the manner customary with pots of this general description. I have selected for illustration a design of coffee pot which is made of earthenware and which has been found to be especially desirable for the purpose.

My present invention has to do with the spout and particularly with the discharge end of the spout. I believe the body and that part of the spout below the curved upper end may be varied in many ways without affecting my invention and it will be understood, therefore, that this pot and the lower portion of the spout are merely illustrative. The discharge end of the spout is characterized by an elongated lip, the top side 6 of which is concavely curved transversely and slightly convexly curved longitudinally. The end 7 of the lip is rounded and the underside 8 is curved transversely and longitudinally to correspond with the top side 6 thereof. The neck or elbow 9 is curved at or about a right angle. The arc of curvature longitudinally of the lip is very slight as compared with the arc of curvature of the neck or elbow, and the extreme outer end of the lip has a slightly greater degree of curvature than the remainder of the lip. The top 10 of the discharge end of the spout is located some distance back of the forward end 7 of the lip and, in the particular embodiment illustrated in the drawings, this top lies in substantially the plane of the front portion 11 of the spout. In this connection it will be explained that the top wall of the elbow 9 terminates at 10 at the highest point of the arc thereof, so that any moisture accumulating within the upper portion of the elbow will flow rearwardly and downwardly through the spout after a pouring operation and when the pot is returned to its normal horizontal position. Also it is important to locate the front edge 10 of the top wall of the elbow above the rear or inner end of the lip so as not to overhang the lip, as otherwise moisture would accumulate on the overhanging elbow portion and drain down into the lip and cause such an accumulation of moisture on the lip as to form a large drop heavy enough to run out of and drop from the discharge end of the lip. The sides of the spout taper from the top 10 to the end 7 of the lip and the edges 12 of the sides are shaped in a reverse curve. The spout gradually narrows from its lower inlet end 13 to its discharge end, as is customary in many coffee and other pots, and the passage in the spout may correspond generally to the exterior shape of the spout, as also has been customary heretofore; but I have found it desirable and I prefer to make the passage somewhat oval in shape beneath the top 10 of the discharge end of the spout and continue this shape in a general way to the end 7 of the lip. I have said that this passage is oval in shape beneath the top 10 of the discharge end of the spout, but I believe it would be better understood if I said that the passage on the line 4—4 of Fig. 2 is oval round, by which I mean that it is not a perfect circle but is an oval very close to being a circle.

I have found in extensive commercial use and after a long series of experiments and tests that a spout, as herein shown and described, will not drip or drivel under any usual conditions of the domestic use of a coffee pot, or the like. I do not mean to say that there will be no appearance of the fluid contents of the pot at the end of the lip after a pouring operation, but I do mean to say that there will be no dripping and there will be no driveling down the surface of the spout. I have observed sometimes that a little of the fluid contents of the pot will gather on the bottom of the lip at the extreme end thereof, especially after repeated pourings at short intervals, but I have never observed this slight accumulation of fluid to drip or drivel; in fact, what I have observed has been less in quantity than is ordinarily represented by a drop which would drip, or a drop which would drivel. I attribute the success of my spout primarily to the shape of the lip.

When the pot is tilted from pouring position to normal horizontal position, the stream flowing from the spout is cut off somewhere on the lip between the extreme end thereof and the neck or elbow of the spout. The exact location is difficult to determine. It appears to be somewhat removed from the extreme end. I have repeatedly noted that after the pot is returned to normal position the fluid on the lip, and including whatever fluid remains adjacent the extreme end thereof, continues to flow inwardly to the neck or elbow of the spout. In other words, whatever fluid remains on the lip between the extreme end thereof and the neck or elbow of the spout continues to flow down the inside of the spout after the pot has been returned to horizontal position. It would seem as if the fluid on the lip adjacent the end thereof would flow over the end to the underside of the lip and form a drop to fall from the lip or to drivel down the outside of the spout, but this does not happen; on the contrary whatever fluid remains on the lip adjacent the end thereof draws back, so to speak, and flows inward and disappears down the spout. I state this as a fact and notwithstanding the upward inclination of the top side of the lip from the extreme outer end. There may be a slight accumulation of fluid on the underside of the lip at the extreme end, but not sufficient to drip and not sufficient to drivel.

My invention is simple in character but it overcomes an objection which is common to all coffee pots, and the like, so far as I am aware. It entirely prevents the objectionable dripping and driveling common to coffee pots and it involves no obstruction to the flow of coffee nor any additional parts or special manipulation. The invention is adaptable to teapots and other pots and where I have used the expression "coffee pots" I mean to include any kind of pots in which the invention may be used.

It may be found desirable to change the size or shape or other details of the invention in adapting it to pots of different kinds and sizes, or for other purposes, and I reserve the right to make all such changes as fairly fall within the scope of the following claims:

I claim:—

1. A spout for a coffee pot, or the like, having an elongated lip projecting beyond the top of its discharge end, and an abrupt elbow connecting the spout and the lip, the top side of the lip and the bottom side of the lip being slightly convexly curved longitudinally and the extreme outer ends of said top side and bottom side being slightly rounded to merge together at the extreme outer end of the lip, the said longitudinal curvature of the top side and of the bottom side of the lip being so slight that both said top side and said bottom side are almost horizontal and parallel, the top side having such a slight curvature that when the pot is returned to horizontal position after pouring whatever fluid remains on the top side of the lip will draw back and run down inside the spout, and the bottom side of the lip being sufficiently lowered at its extreme end to prevent any accumulation of fluid thereon from traveling outside the spout.

2. A spout for a coffee pot, or the like, having an elongated lip projecting beyond the top of its discharge end, and an abrupt elbow connecting the spout and the lip, the front edge of the top of the elbow being located at the highest part of the arc thereof and substantially at the rear end of the lip, the top side of the lip and the bottom side of the lip being slightly convexly curved longitudinally and the extreme outer ends of said top side and bottom side being slightly rounded to merge together at the extreme outer end of the lip, the said longitudinal curvature of the top side and of the bottom side of the lip being so slight that both said top side and said bottom side are almost horizontal and parallel, the top side having such a slight curvature that when the pot is returned to horizontal position after pouring whatever fluid remains on the top side of the lip will draw back and run down inside the spout, and the bottom side of the lip being sufficiently lowered at its extreme end to prevent any accumulation of fluid thereon from travelling outside the spout.

ISAAC D. RICHHEIMER.